M. TOLLE
Cultivator.
No. 17,594.
Patented June 16, 1857.
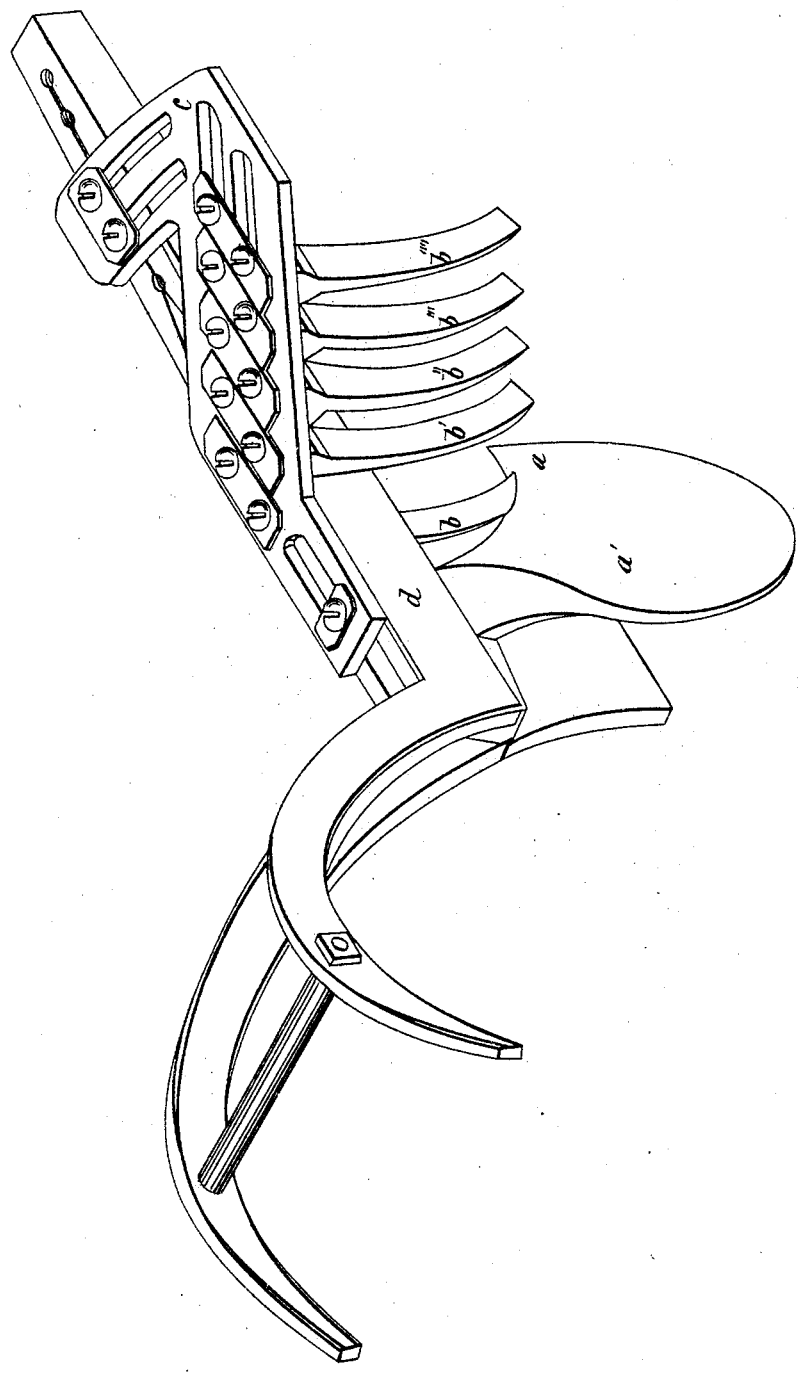

UNITED STATES PATENT OFFICE.

MICAJAH TOLLE, OF NEWPORT, KENTUCKY.

IMPROVEMENT IN CULTIVATOR-PLOWS.

Specification forming part of Letters Patent No. 17,594, dated June 16, 1857.

*To all whom it may concern:*

Be it known that I, MICAJAH TOLLE, of Newport, Campbell county, Kentucky, have invented a new and useful Improvement in Cultivator-Plows; and I hereby declare the following to be a full and exact description thereof, reference being had to the accompanying drawing, making part of this specification.

The object of this invention is to produce a form of cultivator-plow by means of which the loose friable earth alone is hilled up to the plants, while the clods are removed away from them.

$a\ a'$ are the share and mold-board of a hilling-up plow. $b\ b'\ b''\ b'''\ b''''$ is a series of knives or colters, which colters being attached to a bracket, $c$, on the beam project downward and are curved forward toward their points and sharpened on their front edges. Of this series the blade $b$ depends from the beam to near the point of the share, and from thence the series ranges forward and furrowward in the manner represented, so as in their collective capacity to present an inclined and oblique range of sharp edges, which cut and admit the passage of the more friable mold to be turned onto the hill by the mold-board, but intercept the clods and (by means of their obliquity with the line of draft) conduct them beyond the landside of the plow and out of the way of the plants. The bracket $c$ is slotted, and the beam $d$ perforated in the manner represented, so as to admit of adjustment of the entire range of blades longitudinally of the beam, and to any angle therewith, and the individual blades to a greater or less distance from each other.

I am aware that various forms of hoes and harrows having their teeth placed obliquely with the line of draft have been employed both for removing clods and covering seed, and also that oblique arrangements of teeth in various forms exist commonly in harrows, cultivators, &c.

What I claim as new, and desire to secure by Letters Patent, is—

The bracket $c$, in combination with the plow-beam $d$, constructed, arranged, and operated in the manner substantially as and for the purposes set forth.

In testimony of which invention I hereunto set my hand.

MICAJAH TOLLE.

Witnesses:
GEO. H. KNIGHT,
JAS. H. GRIDLEY.